Jan. 30, 1945. G. P. SCHMITT 2,368,381

CATALYTIC LIGHTER

Filed March 1, 1943

INVENTOR.
GEORGE PHILIP SCHMITT.
BY
ATTORNEY.

Patented Jan. 30, 1945

2,368,381

UNITED STATES PATENT OFFICE 2,368,381

CATALYTIC LIGHTER

George Philip Schmitt, New York, N. Y., assignor to Cardinal Products Inc., New York, N. Y., a corporation of New York Application March 1, 1943, Serial No. 477,579
In Mexico March 19, 1942

1 Claim. (Cl. 67—7)

This invention relates to lighters which employ a catalyst for igniting cigarettes, cigars, pipes and the like, wherein the vapor of alcohol or other vaporizable liquid is employed for effecting such reaction upon the catalyst, in the presence of air, as will render such catalyst incandescent, so that a cigarette or the like applied thereto and drawn upon may be ignited. More particularly this invention has reference to improvements in the catalyst unit. The catalyst an essential element of this unit is retained in a holder.

Catalytic lighters of the above type operate on the principle that platinum black or other catalytic compound can be made incandescent under the influence of vapor of certain volatile liquid in the presence of atmospheric air. The temperature resulting from the heat produced by the chemical reaction of the vaporizable fuel and air mixture in the presence of the catalyst is sufficiently elevated to ignite the cigarette when applied to or near the catalyst, and drawn upon.

In one of the types of lighters to which the invention has application, the catalyst is contained in a holder between two screens or perforated discs, through the bottom of which the vaporizable fuel passes for coaction with the catalyst, the top screen being employed as a shield or front covering for the catalyst which enables a cigarette applied thereto to be quickly ignited, and at the same time protects the catalyst which is usually in the form of spongy platinum composition, from rupturing while in use.

In catalytic lighters of the flameless type, the catalyst is usually made up in the form of a perforated block, pill or pellet of spongy platinum composition. It has been found that by incorporating in this platinum sponge block or disc a plurality of short, fine platinum wires, a more efficient and practical catalyst is obtained. These platinum wires provide reinforcement for the catalyst disc, making it tenacious and more sturdy and keeping the composition thereof from crumbling or disintegrating. Besides influencing the maintenance of the disc in the form of unitary mass, these platinum wires readily become heated and increase the lighting efficiency of the catalyst. The incorporation of these wires in the catalyst enables the catalytic mass or pill to be made somewhat softer and more porous thereby increasing the incandescent quality of the pill.

It is an object of the present invention to provide a more serviceable and efficient catalyst for a flameless catalytic lighter.

It is a further object of the present invention to provide a catalyst of the heretofore mentioned type which will readily become heated and its possible disintegration due to various causes is decreased.

It is a further object of the present invention to provide a catalytic holder so constructed as to slightly compress the end of the cigarette to be lighted (adjacent its top) when applied to the catalyst, thereby facilitating the lighting thereof; the said construction also preventing the cigarette paper at the tip from contacting the inner wall of the holder.

These and other objects and advantages of the invention and the means for their attainment will be more apparent from the following detailed description, taken in connection with the accompanying drawing illustrating embodiments of which the invention may be realized and in which.

Figure 1:
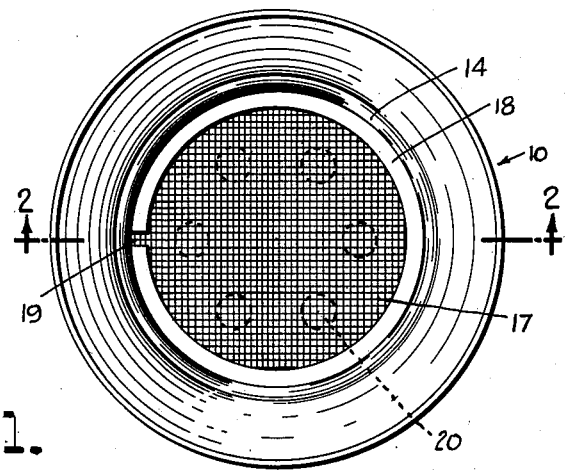
Fig. 1 is a top plan view of a catalyst unit for a lighter, embodying the invention.
Figure 3:
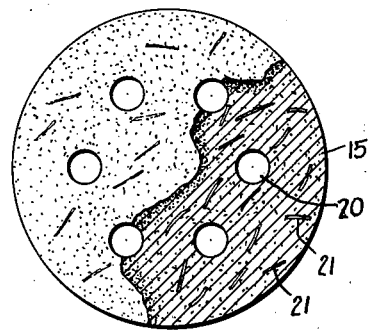
Fig. 3 is a plan view partly in section of a catalyst made in accordance with the invention.
Figure 2:
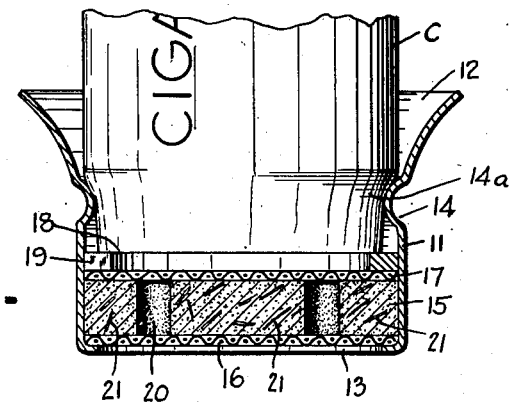
Fig. 2 is a sectional view taken along line 2—2 of Fig. 1, with the top portion of the cigarette in operative position.

The catalyst unit generally designated by the numeral 10 comprises the holder or shell 11 in which the catalyst 15 is seated. Holder 11 has its upper end 12 flared for guiding the cigarette C to the catalyst 15. The bottom wall of the holder 11 is provided with an opening 13 which communicates with the conventional fuel supply (not shown). Shell or holder 11 is preferably constructed with a constricted portion as indicated at 14 thereby causing compression of the tip of the cigarette C as shown at 14a, when placed in the holder.

Catalyst 15 is disposed between a pair of screens 16, 17, the catalyst and screens resting against the bottom of shell 11 and held in such position by an expansion or snap ring 18 having a cut 19 to permit the contraction of the ring when passing over the construction 14.

The catalyst pill 15 which is usually made of platinum black or spongy platinum is preferably provided with a plurality of vent holes 20, and also has intermingled with the catalyst mass a plurality of short strands of platinum wire 21.

These platinum wires 21 are preferably .001 inch thick and from one-sixteenth to one-eighth inch long. The platinum strands being soft, they are preferably made to contain substantially five percent of ruthenium, thus increasing the tensil strength of the wires.

These wire strands 12 perform a dual purpose, namely, that of increasing the strength of the pill and facilitating incandescense thereof.

In making up the catalyst pill these ruthenium-contained platinum wires are mixed with the platinum black composition, preferably to the extent of about substantially one and one-half percent.

As changes of construction can be made within the scope of the invention, it is intended that all matters contained in the foregoing description or shown in the accompanying drawing shall be interpreted as illustrative and not in a limiting sense.

Having thus described the invention what is claimed as new, and desired to secure by Letters Patent, is:

In a catalytic cigarette lighter, a metallic cup having an annular wall, a catalyst in said cup, a metal ring above said catalyst, said cup having a portion containing said catalyst and a constricted portion in its annular wall above said first named portion engageable with a cigarette to be lighted by heat from said catalyst, said constricted portion comprising an inwardly projecting bead forming a continuation of said annular wall, arcuate in cross section and adapted to guide and compress the tip part of a cigarette when the latter is positioned in said cup and to form an annular closed chamber between said ring, the wall of the cigarette and the annular wall of the cup below said bead.

GEORGE PHILIP SCHMITT.